July 21, 1936.　　　　F. C. HOLTZ　　　　2,048,121
ELECTRICALLY ENERGIZED TIME MECHANISM
Filed May 21, 1934　　　2 Sheets-Sheet 1

Inventor:
Frederick C. Holtz.
By Brown, Jackson, Boettcher + Dienner
Attys.

July 21, 1936.  F. C. HOLTZ  2,048,121

ELECTRICALLY ENERGIZED TIME MECHANISM

Filed May 21, 1934

Inventor:
Frederick C. Holtz.
By Brown, Jackson, Boettcher & Dienner
Attys.

Patented July 21, 1936

2,048,121

UNITED STATES PATENT OFFICE 2,048,121

ELECTRICALLY ENERGIZED TIME MECHANISM

Frederick C. Holtz, Springfield, Ill., assignor to Sangamo Electric Company, Springfield, Ill., a corporation of Illinois Application May 21, 1934, Serial No. 726,650

3 Claims. (Cl. 185—40)

The present invention relates to time mechanisms of the type employing a spring for driving a clock movement or clock escapement, and characterized particularly by the use of an intermittently energized electric motor for intermittently restoring energy or tension in the spring. This type of device is of particular utility as an electrically energized time mechanism for installations and localities where direct current is the only current available or where there is no closely controlled alternating current such as would permit of the satisfactory use of synchronous motor driven time mechanisms. The present time mechanism of my invention may be embodied in clocks, direct current demand meters, time switches, etc.

One of the objects of the invention is to provide time mechanism of the above general description characterized by an improved and unique relationship between the spring which serves as the primary driving device for the clock movement and the oscillatory armature electric motor which restores energy to this spring. In the preferred embodiment of the invention, this main driving spring transmits its energy to the clock movement through the oscillatable armature of the electric motor. The spring slowly oscillates the armature in one direction in transmitting power to the clock movement, and after the armature has been thus moved through a predetermined distance, the motor is suddenly energized for quickly oscillating the armature in the opposite direction and thus restoring energy to the spring. The energization and deenergization of the electric motor occurs practically instantaneously, only oscillating the armature through a limited motion sufficient to restore energy to the relatively light main driving spring, and this preferably taking place at relatively frequent intervals, say every twenty or thirty seconds, so that the energization of the motor does not take any appreciable current. The sudden reversal of motion of the armature taking place when the motor is energized is accommodated by a ratchet mechanism interposed between the armature and the clock escapement.

One of the principal objects of the invention is to provide improved contact mechanism for opening and closing the circuit of the electric motor. This contact mechanism is characterized by a quick make as well as a quick break. Heretofore, most contact mechanisms employed in time apparatus of this general description have depended upon either slow make or some form of wiping contact which almost invariably becomes a source of trouble. With the construction of my invention, however, contact pressures are maintained at their maximum value until the moment of opening, which is then accomplished without any wiping action in a substantially instantaneous break, such reducing the arcing and insuring the best operating conditions. The contact mechanism is actuated by the aforementioned ratchet mechanism, responding to the conjoint action of the teeth of the ratchet wheel and of the pawl which advances the ratchet wheel.

Another object of the invention is to provide improved carry-over mechanism which will carry over current interruptions of moderate duration, i. e., this mechanism will continue to supply operating energy to the clock escapement notwithstanding a service interruption of current to the electric motor of several minutes duration. This carry-over spring also continues to supply energy to the clock escapement through the almost infinitesimal time interval in which the armature is oscillating in its reverse direction under the electromagnetic influence of its motor.

Other objects and advantages of the invention will appear from the following detail description of one preferred embodiment thereof. In the accompanying drawings illustrating such embodiment:—

Figures 4, 5, 6 and 7 are detail views illustrating different positions of the ratchet mechanism and of the contact mechanism.

Figure 1:
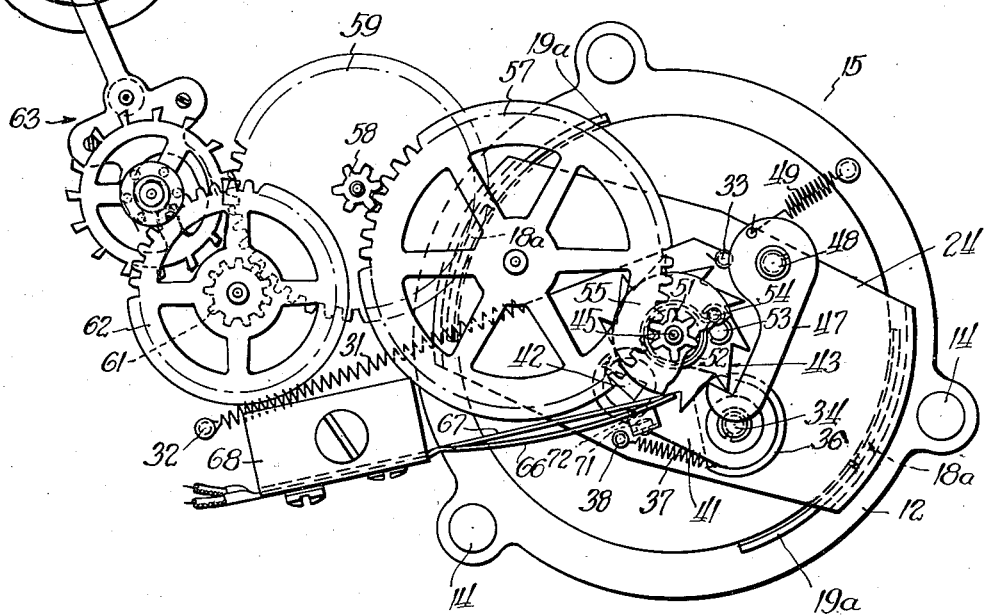
Figure 1 is an elevational view, somewhat diagrammatic in character, illustrating the electric motor, ratchet mechanism, contact mechanism, and gear train of the clock movement or clock escapement.

The different parts of the assembly may be mounted on a frame structure of any desired type. In the illustrated construction, referring to Figure 2, this frame structure comprises a top plate 11, an intermediate plate 12, and a bottom plate 13, all secured in spaced relation by spacing posts similar to those indicated at 14, 14. The electric motor, designated 15, is mounted on the back plate 13 and includes a stator structure comprising a central core 16, a winding 17 thereon, two U-shaped stampings 18 and 19 secured to one end of said core, and a flat disc 21 secured to the other end thereof. A disc or plate 22 is interposed between the transverse portions of the two U-shaped stampings 18 and 19, where these stampings have attachment to one end of the core 16. The two upwardly turned ends or legs 18a of the stamping 18 are located at diametrically opposite sides of the coil. Likewise, the two upwardly turned legs or ends of the other U-shaped stamping 19 are positioned at diametrically opposite sides of the coil and are disposed in close proximity to the legs or extensions 18a of the first stamping, and in the same circular arc or radii therewith. These extensions or legs are spaced outwardly from the periphery of the end disc 21 and constitute poles towards which the poles of the rotor are attracted when the coil 17 is energized.

Figure 2:
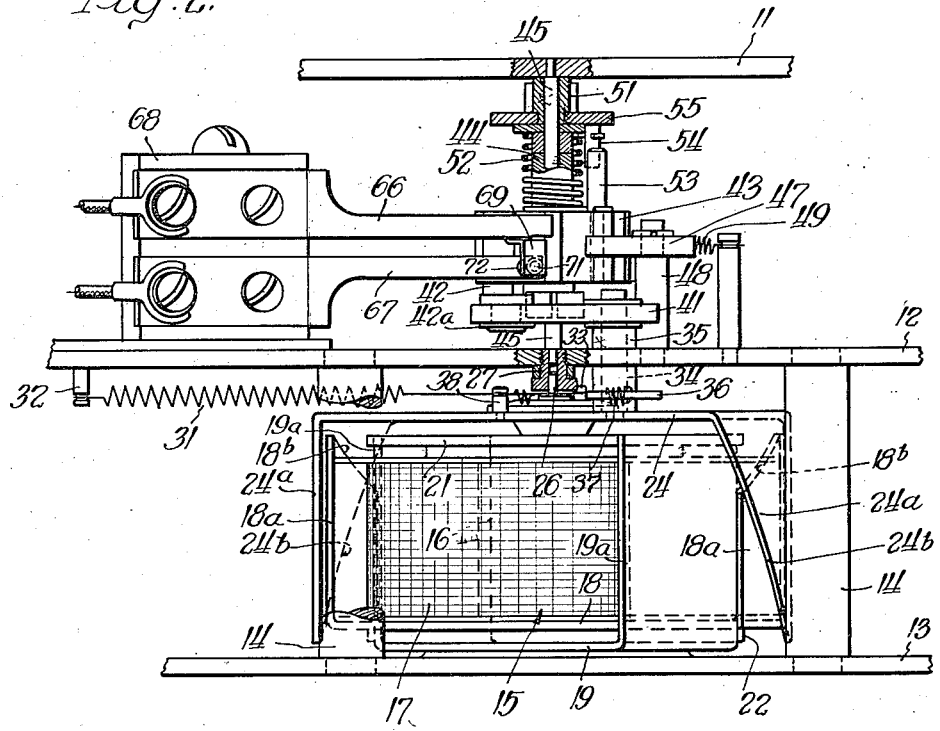
Figure 2 is a view at right angles thereto, partly in section, illustrating the electric motor, ratchet mechanism and contact mechanism.
Figure 3:
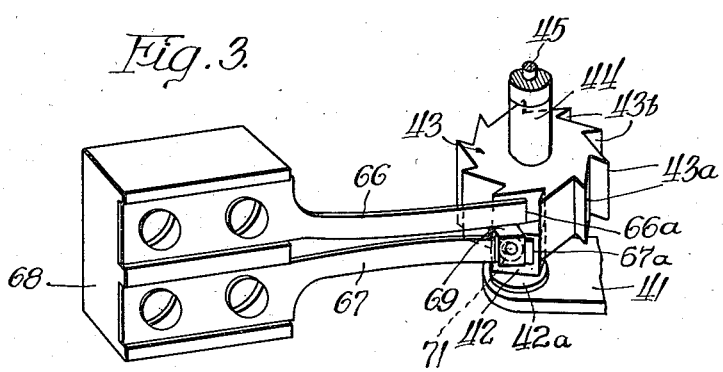
Figure 3 is a perspective view illustrating the cooperation between the ratchet mechanism and the contact mechanism.

The oscillatable armature, designated 24, also consists of a U-shaped stamping having rearwardly bent extensions or legs 24a constituting armature poles. These armature poles extend back over the outside of the stator poles and oscillate in close proximity thereto. The approaching edge 24b of each rotor pole 24a is preferably cut on a diagonal so that there will be an increasing area of registration or overlap between the rotor poles and stator poles as the armature oscillates towards the full limit of its attracted position. Similarly, the stator poles 18a are cut on a diagonal reverse to that of the rotor poles, as indicated at 18b. Figure 2 shows the armature in its attracted position; in its retracted position only a small portion of each armature pole 24a lies opposite the tip extremity of each stator pole 18a. The armature is mounted on a spindle 26 which has bearing support at one end in a bearing bushing 27 carried by the plate 12 and which has bearing support at its other end within the core 16.

The main driving spring which transmits energy to the clock escapement under normal operating conditions is shown as a tension spring 31 operatively arranged to transmit its energy through the armature 24, although it will be evident that other types of springs may be used. One end of said spring is anchored to a pin 32 mounted on the plate 12, and the other end of the spring is connected to a pin 33 carried by the armature, the pull of said spring normally tending to oscillate the armature back to its retracted position, which corresponds to a counterclockwise direction of oscillation of the armature as viewed in Figure 1. Fixedly secured to the armature is a pivot stud 34, and oscillatably mounted on this stud is a sleeve or bushing 35. This stud and sleeve assembly pass through a relatively large hole in the supporting plate 12 and the two sides of this hole may function as limiting stops for limiting the movement of the armature in either direction. A short arm or collar 36 projects from one end of the sleeve 35 and a tension spring 37 is connected between this arm or collar and a pin 38 mounted on the armature, the action of said spring being that of tending to rotate the sleeve 35 clockwise (as viewed in Fig. 1) about the stud 34. The opposite end of the sleeve 35 has a ratchet arm 41 fixedly secured to the sleeve, said ratchet arm carrying a ratchet tooth or pawl 42 at its swinging end. The ratchet pawl is preferably of metal, consisting of an extension of a metallic bushing 42a secured in the end of the arm 41, and said arm 41 is preferably composed of insulating material for insulating the pawl 42 from the sleeve 35. The ratchet pawl 42 imparts advancing motion to a ratchet wheel 43 which is mounted between the supporting plates 11 and 12, as are also the parts of the gear train and clock escapement driven from this ratchet wheel. The wheel is composed of insulating material mounted on a metallic bearing bushing 44 which has a spindle 45 supported at one end in the bearing bushing 27 and at the other end in the front supporting plate 11. Thus, the axis of the ratchet wheel 43 is coincident with the axis of the armature 24 of the electric motor. The ratchet pawl 42 is only effective to advance the ratchet wheel 43 in one direction, and motion of said wheel in the opposite direction is positively prevented by a detent pawl or dog 47, which is best shown in Figure 1. The detent pawl is pivotally mounted on a stud 48 carried by the supporting plate 12, and a tension spring 49 swings the hook nose of said pawl into the ratchet teeth. If desired, the pivot stud 48 may be mounted on an adjustable member whereby the axis of the detent pawl may be shifted for adjusting the time when the nose of said pawl drops back of each succeeding ratchet tooth in the movement of the ratchet wheel. From the description given thus far, it will be seen that so long as the motor 15 is deenergized, the driving spring 31 will impart a torque to the armature 24, which torque will be transmitted through the pivot stud 34, moving directly with the armature, through the sleeve 35, ratchet arm 41 and ratchet pawl 42 to one of the teeth of the ratchet wheel, whereby the torque of said spring tends to rotate said ratchet wheel in an advancing direction so long as the motor is deenergized. This torque is transmitted through the gear train, to be presently described, to the clock escapement, and during the time intervals when the motor is deenergized the ratchet wheel moves with a slow rotative movement in transmitting torque to the clock escapement. The energization and deenergization of the electric motor occur substantially in an instant, and at this time the armature oscillates in the opposite direction, restoring energy in the spring 31 and oscillating the ratchet pawl 42 back to engage the next succeeding tooth of the ratchet wheel. The detent pawl 47 holds the ratchet wheel against retrograde movement in this quick reverse oscillation of the armature.

Referring now to the train of operating parts through which the ratchet wheel 43 transmits the torque of the driving spring 31 to the clock escapement, a small pinion 51 is rotatably mounted on the spindle 45 and is arranged to be driven from the ratchet wheel through a torsion spring 52 and through two pins 53 and 54 (Figure 2). The pin 53 is mounted in the ratchet wheel 43 and the pin 54 is secured to a disc 55 which is fastened to the pinion 51. One end of the torsion spring 52 is anchored to the pin 53, and the other end of the spring is anchored to the pin 54. The strength of the spring 52 is preferably less than that of the main driving spring 31. Hence, under normal operating conditions, and during the non-energized intervals of the electric motor, the torque which the main driving spring 31 transmits to the ratchet wheel 43 holds the pin 53 against the pin 54 so that the torque of the ratchet wheel is transmitted positively to the pinion 51. When the driving pin 53 is thus in direct pressure contact with the driven pin 54, the spring 52 is under torsional pressure tending to advance the driven pin 54 away from the driving pin 53 at any instant that the motion of the driving pin 53 should be interrupted. Consequently, in the event of a service interruption of current to the electric motor 15, the spring 52 will continue to revolve the pin 54 and pinion 51 after the driving pin 53 has stopped in its rotation. This relation of the parts establishes a carry-over function so as to carry over service interruptions of moderate length and keep the clock mechanism operating. The carry-over rotation of the driven pin 54 will continue until this pin revolves around and engages the opposite side of the driving pin 53, this being substantially a complete revolution of the pin 54 and pinion 51, corresponding to several minutes' duration. When current is restored to the service line feeding the motor 15, the motor operates rapidly for stepping the ratchet wheel 43 around to take up the lost motion between the pins and to bring the driving pin 53 back to its former position for transmitting positive driving torque to the driven pin 54.

The pinion 51 transmits rotation to the clock movement or clock escapement through any conventional gear train, such as is diagrammatically illustrated in Figure 1. Here the pinion 51 is shown as meshing with a large gear 57 which in turn drives a pinion 58. The pinion 58 is secured to another large gear 59 which drives a small gear 61. The gear 61 is secured to a larger gear 62 which transmits motion to the escapement mechanism, this escapement mechanism being of any conventional type and being indicated in its entirety at 63. The gear train and the escapement mechanism are preferably mounted between the supporting plates 11 and 12 and the several gears and other moving parts of the assembly are mounted on suitable arbors or spindles which are journaled in these plates. The apparatus which is to be time controlled, such as clock hands, time switch parts, meter parts, etc. can be operatively connected with any of these spindles, either directly, or through additional gearing or other motion transmitting parts.

Referring now to the contact mechanism, this mechanism is controlled by the ratchet pawl 42 and by the ratchet wheel 43 in such manner that the closing of the motor circuit is controlled by the angular motion of the ratchet wheel, and the opening of the motor circuit is controlled by the ratchet pawl 42 reaching the end of its retractive movement and dropping in back of the succeeding ratchet tooth. The contact mechanism comprises two contact carrying members preferably in the form of thin leaf springs or spring strips 66 and 67 which are disposed side by side with their fixed ends mounted in an insulating block 68 fastened to the supporting plate 12. These two springs are connected in series in the motor circuit to control the latter. The free ends of the two springs press respectively against the ratchet wheel and against the ratchet pawl 42. The spring 66 is formed with an L-shaped extension 69 which projects outwardly and then laterally to extend across the back side of the other spring 67. The L-shaped portion 69 carries a contact 71 on its inner face for cooperating with a contact 72 provided on the back surface of the spring 67. This L-shaped extension is so proportioned that the contacts 71, 72 are maintained separated when the extremities of the two springs are resting on the same level. The spring 66 is responsive primarily to the movement of the ratchet teeth 43a under this spring, said spring tending to flex inwardly when the extremity 66a of the spring drops off the point or edge of one of the ratchet teeth 43a.

The other spring 67 is responsive primarily to the ratchet pawl 42, this spring being disposed in the plane of movement of the pawl so as to flex inwardly and outwardly with the motion of the pawl. Said pawl is substantially in the shape of a wedge or triangle, of a size approximately filling the tooth space 43b between adjacent ratchet teeth 43a, but not extending laterally substantially beyond the plane of the spring 67, so that only this latter spring is engaged by the pawl. The extremity 66a of the spring 66 is shown as reaching slightly beyond the extremity 67a of the other spring, but the two springs might be made of the same length if desired.

Figure 4 illustrates the relation of these parts when the motor is deenergized and the ratchet pawl 42 is slowly advancing the ratchet wheel under the tension of the driving spring 31. The motion of the ratchet wheel is relatively slow, since its speed is governed by the clock escapement mechanism 63. The motor armature 24 is, of course, also moving back towards its neutral or initial position at this same speed. At this time, the tip ends of the two springs 66 and 67 are riding on the rising slope of one of the ratchet teeth 43a. As previously remarked, the L-shaped extension 69 of the spring 66 is so proportioned that when the two springs 66, 67 are disposed at the same level, such as when they are thus riding on the rising slope of one of these ratchet teeth, the contacts 71, 72 are separated.

After the pawl has advanced the ratchet wheel through substantially the distance of one tooth, the parts arrive in the position illustrated in Figure 5. At this instant, the extremity of the spring 66 has just dropped off the tip of the ratchet tooth and has swung inwardly into the tooth space 43b. The other spring 67 cannot move in correspondingly, because the ratchet pawl 42 is filling this portion of the tooth space and is holding said spring 67 in an outwardly flexed position. Hence, the differential motion caused by the spring 66 moving inwardly into a tooth space, and the spring 67 remaining at substantially the same level, causes the two contacts 71, 72 to be brought together. It will be noted that, despite the slow motion of the ratchet wheel, the engagement of the contacts occurs instantly by the action of the end of the spring 66 snapping off the edge of the ratchet tooth, resulting in a quick make of the circuit.

Figure 6 shows the position of the parts as the ratchet pawl 42 is moving backwardly under the energization of the motor preparatory to engaging the next ratchet tooth, this backward motion being substantially instantaneous with the quick energization of the motor. As the wedge-shaped ratchet pawl rides up the inclined slope of the tooth 43a, it presses the contact spring 67 outwardly. Since the contacts 71 and 72 are in engagement at this time, they afford a thrusting connection for also flexing the other spring 66 outwardly, thereby maintaining the two contacts in pressure engagement.

Figure 7 illustrates the position of the parts when the ratchet pawl has completed its rearward stroke. When the end of the pawl passes beyond the edge of the tooth 43a, it snaps inwardly into the tooth space 43b behind this tooth and drops the two contact springs 66, 67 back upon the top surface of the ratchet tooth. This means that the two contact springs are brought to rest on the same level, and hence the contacts 71, 72 are separated. This action of the ratchet pawl dropping off the edge of the ratchet tooth occurs with a quick snap and, hence, a quick break occurs between the contacts 71, 72. The motor is now deenergized, and the main driving spring 31, with the renewed energy stored therein, starts moving the ratchet wheel through the next step of its motion, which is a repetition of the cycle above described.

As previously remarked, during the normal operation of the mechanism the driving pin 53 maintains contact with the driven pin 54 so that a positive drive is transmitted from the ratchet wheel to the pinion 51, except possibly during the infinitesimal time interval in which the ratchet pawl is reversing, and during this time the torsion spring 52 is functioning to transmit torque to the pinion 51. In the event of a service interruption in the supply of current to the motor, the main driving spring serves to move the ratchet wheel to the position illustrated in Figure 5, at which time the contacts 71, 72 are closed. Thereupon, the torsion spring 52 continues the rotation of the pinion 51 through the range of lost motion effective between the pins 53 and 54, i. e., until the driven pin 54 revolves through substantially a complete revolution and engages the opposite side of the driving pin 53, which is an interval of several minutes duration. Obviously, the parts may be so proportioned that this carry-over interval may be made much longer if desired. In the preferred proportioning of the gear ratio between the pinion 51 and the escapement mechanism, the electric motor is energized for a one step advancement of the ratchet wheel every twenty or thirty seconds, whereby the current consumption at each energization is made relatively small, but it will of course be understood that the gear ratio may be otherwise proportioned for a more frequent or less frequent energization of the motor.

While I have illustrated and described what I regard to be the preferred embodiment of my invention, nevertheless it will be understood that such is merely exemplary and that numerous modifications and rearrangements may be made therein without departing from the essence of the invention.

I claim:—

1. In apparatus of the class described, the combination of a ratchet wheel, a pawl for transmitting motion to said ratchet wheel, a spring for moving said pawl in one direction, electromagnetic means operative to move said pawl in the opposite direction, first and second leaf springs both having their extremities movable into and out of the same tooth space in said ratchet wheel, one of said leaf springs adapted to ride on said pawl and to snap inwardly therewith when said pawl snaps into one of the tooth spaces, the other of said leaf springs adapted to ride on the teeth of said ratchet wheel and to snap into the tooth spaces therebetween, and contacts carried by said leaf springs controlling the energization of said electromagnetic means.

2. In apparatus of the class described, the combination of a ratchet wheel, a pawl for transmitting motion to said ratchet wheel, a spring for moving said pawl in one direction, electromagnetic means operative to move said pawl in the opposite direction, first and second leaf springs both having their extremities movable into and out of direct engagement with said ratchet wheel, one of said leaf springs adapted to ride on said pawl, and the other of said leaf springs adapted to ride on the teeth of said ratchet wheel and to snap into the tooth spaces therebetween, said pawl moving past the extremities of both of said leaf springs in the operation of advancing said ratchet wheel, and contacts carried by said leaf springs controlling the energization of said electromagnetic means.

3. In apparatus of the class described, the combination of a ratchet wheel, an advancing pawl for transmitting advancing motion to said ratchet wheel, a spring for moving said pawl in an advancing direction, electromagnetic means operative to move said pawl in the opposite direction, said advancing pawl comprising a wedge-shaped portion adapted substantially to fill the tooth space between adjoining teeth of said ratchet wheel in one plane of said wheel, first and second leaf springs disposed substantially side by side, both of said leaf springs having their extremities movable into and out of direct engagement with said ratchet wheel and into and out of the same tooth space in said ratchet wheel, one of said leaf springs adapted to ride on the wedge shaped portion of said pawl and to snap inwardly therewith when said pawl snaps into one of the tooth spaces, the other of said leaf springs adapted to ride on the teeth of said ratchet wheel and to snap into the tooth spaces therebetween in another plane of said wheel, said pawl moving past the extremities of both of said springs in the operation of advancing said ratchet wheel, and contacts carried by said leaf springs controlling the energization of said electromagnetic means.

FREDERICK C. HOLTZ.